US007019728B2

(12) United States Patent
Lee et al.

(10) Patent No.: US 7,019,728 B2
(45) Date of Patent: Mar. 28, 2006

(54) # LCD FOR SPEEDING INITIAL BEND STATE, DRIVER AND METHOD THEREOF

(75) Inventors: Chang Hun Lee, Suwon (KR); Jae Jin Lyu, Kyungki-do (KR); Hak Sun Chang, Seoul (KR); Jae Ho Choi, Seoul (KR); Keun Shik Nah, Incheon (KR)

(73) Assignee: Samsung Electronics Co., Ltd., (KR)

( * ) Notice: Subject to any disclaimer, the term of this patent is extended or adjusted under 35 U.S.C. 154(b) by 690 days.

(21) Appl. No.: 09/986,707

(22) Filed: Nov. 9, 2001

(65) Prior Publication Data

US 2002/0057247 A1 May 16, 2002

(30) Foreign Application Priority Data

Nov. 10, 2000 (KR) .............................. 2000-66757
Apr. 26, 2001 (KR) .............................. 2001-22646

(51) Int. Cl.
*G09G 3/36* (2006.01)

(52) U.S. Cl. .......................... 345/98; 345/95; 345/102

(58) Field of Classification Search .......... 345/87–104; 349/34

See application file for complete search history.

(56) References Cited

U.S. PATENT DOCUMENTS 4,411,496 A * 10/1983 Nonomura et al. ........... 349/34
5,774,197 A * 6/1998 Nakamura .................. 349/117
6,005,646 A * 12/1999 Nakamura et al. ............ 349/33
6,069,620 A * 5/2000 Nakamura et al. .......... 345/214
6,476,792 B1 * 11/2002 Hattori et al. ............. 345/102
6,671,009 B1 * 12/2003 Hattori et al. ................ 349/33

FOREIGN PATENT DOCUMENTS

JP 09090909 A * 4/1997

* cited by examiner

*Primary Examiner*—Dennis-Doon Chow
(74) *Attorney, Agent, or Firm*—Cantor Colburn LLP

(57) ABSTRACT

The present invention is directed to a liquid crystal display device and a method for driving the same for a fast transition into a bend state at initial operation such as immediately after power is inputted in a liquid display device with an OCB mode. According to one feature of the present invention, as power is inputted, a timing controller controls to output at least one of a gate voltage for a scan signal, a data voltage for a picture signal, and a driving voltage for a backlight by outputting a first switching signal to a switching unit, and controls to output one of an external bias voltage and a common electrode voltage by outputting a second switching signal to the switching unit so that fast transition into bend state of liquid crystal arranged in a LCD panel is accomplished. As a result, by applying a voltage of less level than that of the typical common electrode voltage to the LCD panel, as DC voltage of at least 10 volt to 20 volt is applicable to a common electrode, time for transition into bend state can be reduced at initial operation of the liquid crystal display device using the LCD panel with OCB mode.

20 Claims, 6 Drawing Sheets

LCD FOR SPEEDING INITIAL BEND STATE, DRIVER AND METHOD THEREOF

BACKGROUND OF THE INVENTION (a) Field of the Invention

The present invention relates generally to a liquid crystal display device and a method and apparatus for driving the same, and more particularly to a liquid crystal display device and a method for driving the same for fast transition into bend state at initial operation such as immediately after power is inputted in a liquid display device with an OCB mode.

(b) Description of the Related Art

In general, as a liquid crystal display device is even thinner and lighter and consumes less power than a cathode ray tube (CRT) dominated up to now in the field of display device, now it is widely used as a display device in potable information apparatuses such as a mobile telephone and a notebook computer. In addition, as it has a weak emission of electromagnetic wave, it is also expected to be a mainstream in a display device for desktop in preference to the CRT in the future.

However, such a liquid crystal display device has a disadvantage in that a view angle property by which brightness and color change depending on a viewing direction is poor. Various approaches for addressing the disadvantage have been suggested.

For example, an approach for improving straightforwardness of light incoming from a backlight by use of a prism attached to a surface of a light plate so that brightness in a vertical direction is increased by more than 30% has been put to practical use and an approach for increasing a view angle by use of a negative light compensation plate is in application.

In addition, though an In Plane Switching mode has been developed to accomplish a wide view angle of 160° of about the same level as CRT, this mode needs further improvement due to its relative low aperture ratio.

Besides, many attempts have been made to increase the view angle, including approaches such as an OCB (Optical Compensated Birefringency) mode, a PDLC (Polymer Dispersed Liquid Crystal) mode, a DHF (Deformed Helix Ferroelectric) driven by TFTs.

Particularly, the OCB mode is now under lively development because of its high speed of response and its wide view angle.

Now, operation of the above OCB mode will be described with reference to FIG. 1.

FIG. 1 shows a view for illustrating operation of a typical OCB mode and FIG. 2 shows a view for ON/OFF cycle of the OCB mode.

Referring to FIG. 1, an initial alignment state of liquid crystal positioned between an upper electrode and a lower electrode is Homogenous state (referred to "H" state hereinafter). At that time, when a predetermined level of voltage is applied to the upper/lower electrodes, "H" state is transferred into Bend state (referred to "B" state hereinafter) via Transient splay (referred to "T" state hereinafter) and Asymmetric splay (referred to "A" state hereinafter) to operate as the OCB mode.

As shown in FIG. 1, a liquid crystal cell in the OCB mode is prepared by rubbing alignment films in same direction, with a pretilt angle in the vicinity of alignment films of about 5°–20° and a cell thickness of 4–7 μm. As orientation of liquid crystal molecules in the middle of liquid crystal layer becomes symmetric, a tilt angle becomes 0° below a specified voltage and 90° above the specified voltage. After the tilt angle of liquid crystal molecules in the middle of liquid crystal layer became 90° by applying a high voltage equal to or more than the specified voltage initially, polarization of light passing the liquid crystal layer is modulated by a change of tilt angle of the remaining liquid crystal molecules other than those in the vicinity of the alignment films and those in the middle of liquid crystal layer with the applied voltage varied.

In the above OCB mode, though it takes several seconds to change the tilt angle of the middle liquid crystal molecules from 0° to 90°, back-flow is not present for a variation of voltage after that and a response time is very short to be in order of 10 ms because of the bend state of the liquid crystal layer and a large modulus of elasticity.

As shown in FIG. 2, for ON state of the typical OCB mode, though a conversion from "T" state to "A" state is fast and a conversion from "T" state to "B" state is relatively fast, a conversion from "A" state to "B" state is slow. As also shown in FIG. 2, for OFF state of the typical OCB mode, though a conversion from "B" state to "H" state is slow, a conversion from "T" state to "H" state or from "A" state to "H" state is fast.

As is described above, the problems are present that it takes several seconds to obtain bend state for the OCB mode and, particularly, the liquid crystal of OCB mode can be worked only when bend state transition is induced through an entire liquid crystal panel by applying a high voltage during a short period after a power switch of a PC monitor or a TV turns on.

Accordingly, it is desirable to provide a technique for shortening time for obtaining bend state and reducing a voltage applied to accomplish bend state.

SUMMARY OF THE INVENTION

In considerations of the above problems, it is an object of the present invention to provide a liquid crystal display device for fast transition into bend state at initial operation such as immediately after power is inputted in a liquid crystal display device with an OCB mode.

It is another object of the present invention to provide an apparatus for driving a liquid crystal display device for fast transition into bend state at initial operation such as immediately after power is inputted in a liquid crystal display device with an OCB mode.

It is still another object of the present invention to provide a method for driving a liquid crystal display device for fast transition into bend state at initial operation of a liquid crystal display device with an OCB mode.

To achieve these objects, according to an aspect of the present invention, a liquid crystal display device comprises, a control unit for receiving a RGB picture signal and a first timing signal from the external and outputting the RGB picture signal, a second timing signal for displaying the RGB picture signal on a screen, a backlight control signal, and a bias signal;

a first direct current power conversion unit responsive to an ON state of the backlight control signal for applying a backlight driving voltage;

a backlight unit for outputting light according to the application of the backlight driving voltage;

a gate driver for outputting a scan signal;

a source driver for a picture signal; and an LCD panel including a plurality of gate line for transmitting the scan signal, a plurality of source line intersecting the plurality of gate lines for transmitting the image signal, a plurality of switching element connected to the plurality of gate line and source line, respectively, and a plurality of picture electrode connected to the plurality of switching element for responding operation of the plurality of switching element, arranged in a matrix type, wherein fast transition into a bend state is induced by an application of the bias voltage at initial operation.

Preferably, the control unit comprises, a timing controller for outputting a first switching signal the backlight control signal of OFF state at initial operation and outputting a second switching signal and the backlight control signal of ON state after a predetermined period elapses;

a second direct current power conversion unit for outputting a predetermined bias voltage; and a switching unit for outputting the bias voltage as the bias signal when the first switching signal is applied by the timing controller and the common electrode voltage as bias signal when the second switching signal is applied by the timing controller.

Preferably, the timing controller applies the backlight control signal of OFF state to the second direct current power conversion unit at the initial operation, and applies backlight control signal of ON state to the first direct current power conversion unit at the point that transition into bend state of liquid crystal arranged in the LCD panel is completed when a predetermined period elapses.

Preferably, the bias voltage is a voltage of less level than the common electrode voltage.

Preferably, the bias voltage is one of −10 volt and −20 volt.

Preferably, the timing controller outputs an alternatively selected one of the first switching signal and the second switching signal when the backlight control signal of OFF state is applied.

Preferably, the control unit comprises, a switching unit for performing a first switching of at least one of a gate voltage for the scan signal, a data voltage for the picture signal, and a driving voltage for the backlight and performing a second switching of at least one of a bias voltage and a common electrode voltage for outputting the bias voltage; and a timing controller for outputting a first switching signal to control the first switching to the switching unit and outputting a second switching signal to control the second switching to the switching unit so that fast transition into bend state of the liquid crystal arranged in the LCD panel is accomplished.

Preferably, the liquid crystal display device further comprises a second direct current power conversion unit for outputting the bias voltage to the switching unit.

Preferably, the switching unit comprises, a first switching unit for ON/OFF switching the gate voltage, the data voltage, and the backlight driving voltage according to the first switching signal; and a second switching unit for ON/OFF switching the bias voltage and the common electrode voltage according to the second switching signal.

Preferably, the timing controller, controls output of the gate voltage, the data voltage, the bias voltage, and the common electrode voltage at initial operation, when a first period elapses, interrupts output of the gate voltage, the data voltage, and the common electrode voltage and controls a selection of the bias voltage, when a second period elapses, controls a selection of the common electrode voltage, and when a third period elapses, controls output of the gate voltage, the data voltage, and the backlight driving voltage and controls a selection of the common electrode voltage.

Preferably, the timing controller controls an alternative selection of a high voltage and a low voltage when the selection of the bias voltage is controlled.

Preferably, the switching unit comprises, a first switching unit for ON/OFF switching the backlight driving voltage according to the switching signal; and a second switching unit for ON/OFF switching the bias voltage and the common electrode voltage according to the switching signal.

Preferably, the timing controller, controls output of the gate voltage, the data voltage, the bias voltage, and the common electrode voltage at initial operation, when a first period elapses, controls the data voltage to be outputted with a level equivalent to the level of the common electrode voltage, when a second period elapses, controls the common electrode voltage to be replaced with the bias voltage, when a third period elapses, controls the bias voltage to be replaced with the common electrode voltage, and when a fourth period elapses, controls output of the backlight driving voltage.

According to another aspect of the present invention, a driving apparatus of a liquid crystal display device including a gate driver for outputting scan signals sequentially; a source driver for outputting picture signals; an LCD panel including a plurality of gate line for transmitting the scan signals, a plurality of data line intersecting the plurality of gate lines for transmitting the picture signals, a plurality of switching element formed in regions surrounded by the plurality of gate line and data line and connected to the plurality of gate line and source line, respectively, and a plurality of picture electrode connected to the plurality of switching element for responding operation of the plurality of switching element, arranged in a matrix type; and a backlight positioned at a back side of the LCD panel, comprises, a control unit for receiving a RGB picture signal and a first timing signal from the external and outputting the RGB picture signal, a second timing signal for displaying the RGB picture signal on a screen, a backlight control signal, and a bias signal; and a first direct current power conversion unit responsive to an ON state of the backlight control signal for applying a backlight driving voltage to the backlight.

According to still another aspect of the present invention, a driving method of a liquid crystal display device including a LCD module including a LCD panel, a gate driver, and a data driver; and a backlight positioned at a back side of the LCD panel, comprising:

(a) a step of inducing transition into bend state by a high voltage by applying a data voltage and a gate voltage not selected at initial operation of the liquid crystal display device to the LCD panel and applying an external bias voltage separately to the LCD panel;

(b) a step of interrupting the external bias voltage when a predetermined time elapses and applying a common electrode voltage to the LCD panel; and (c) a step of applying a predetermined backlight driving voltage to the backlight at the same time of applying the common electrode voltage to the LCD panel.

Preferably, the step (a) further comprises a step of selecting alternatively the external bias voltage and the common electrode voltage several times and applying a selected one of the external bias voltage and the common electrode voltage to the LCD panel.

According to still another aspect of the present invention, a driving method of a liquid crystal display device including a LCD module including a LCD panel, a gate driver, and a data driver; and a backlight positioned at a back side of the LCD panel, comprises, (a) a step of controlling a gate voltage and a data voltage to be applied to the LCD panel at initial operation of the liquid crystal display device and controlling output of an external bias voltage and a common electrode voltage;

(b) a step of preventing the gate voltage, the data voltage, and the common electrode voltage from being applied to the LCD panel, and selecting the external bias voltage to be applied to the LCD panel;

(c) a step of applying the common electrode voltage replacing the external bias voltage to the LCD panel;

(d) a step of, when a predetermined period elapses, interrupting the application of the external bias voltage, applying the gate voltage and the data voltage to the LCD panel, and applying the common electrode voltage to a common electrode line of the LCD panel; and (e) a step of applying a predetermined backlight driving voltage to the backlight at the same time of applying the common electrode voltage to the common electrode line.

Preferably, the step (b) includes applying alternatively a high voltage and a low voltage when the external bias voltage is applied.

According to still another aspect of the present invention, a driving method of a liquid crystal display device including a LCD module including a LCD panel, a gate driver, and a data driver; and a backlight positioned at a back side of the LCD panel, comprises, (a) a step of controlling a gate voltage and a data voltage to be applied to the LCD panel at initial operation of the liquid crystal display device and controlling output of an external bias voltage and a common electrode voltage;

(b) a step of controlling the external bias voltage and the common electrode voltage to be alternatively applied to the LCD panel several times;

(c) a step of applying the common electrode voltage replacing the external bias voltage to the LCD panel;

(d) a step of maintaining output of the common electrode voltage and controlling output of the backlight driving voltage;

(e) a step of, when a predetermined period elapses, interrupting the application of the external bias voltage, applying the gate voltage and the data voltage to the LCD panel, and applying the common electrode voltage to a common electrode line of the LCD panel; and (f) a step of applying a predetermined backlight driving voltage to the backlight at the same time of applying the common electrode voltage to the common electrode line.

Preferably, the step (b) includes controlling the data voltage to be applied with a level equivalent to the level of the common electrode.

Preferably, the data voltage is an alternate voltage.

According to such liquid crystal display device and such diving apparatus and method, the liquid crystal display device comprising a timing controller, a DC—DC converter for outputting an external bias voltage, a switching unit, an LCD panel, and a backlight position in a back side of the LCD panel, since the external bias voltage of more level than the level of the common electrode voltage Vcom used actually is applied to the LCD panel in the OCB mode, fast transition into bend state at initial operation can be accomplished before the LCD panel is driven by the backlight turned on.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENT

Preferred embodiment of the present invention will now be described in detail with reference to the accompanying drawings.

Figure 1:
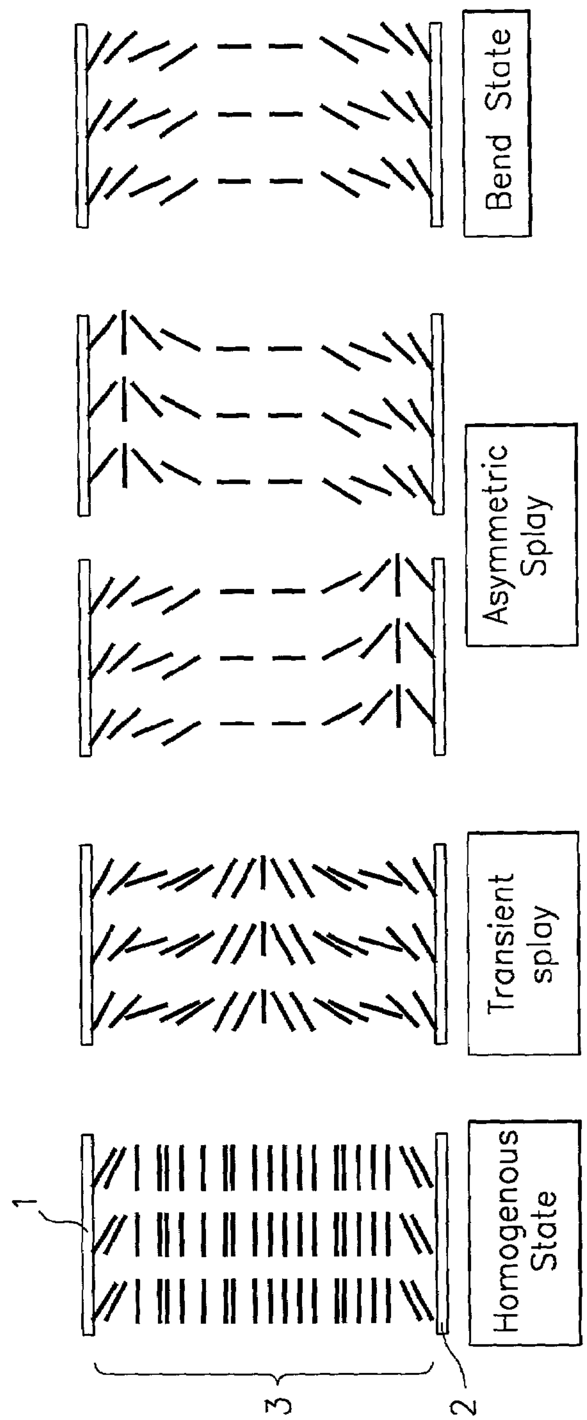
FIG. 1 shows a view for illustrating operation of a typical OCB mode.
Figure 2:
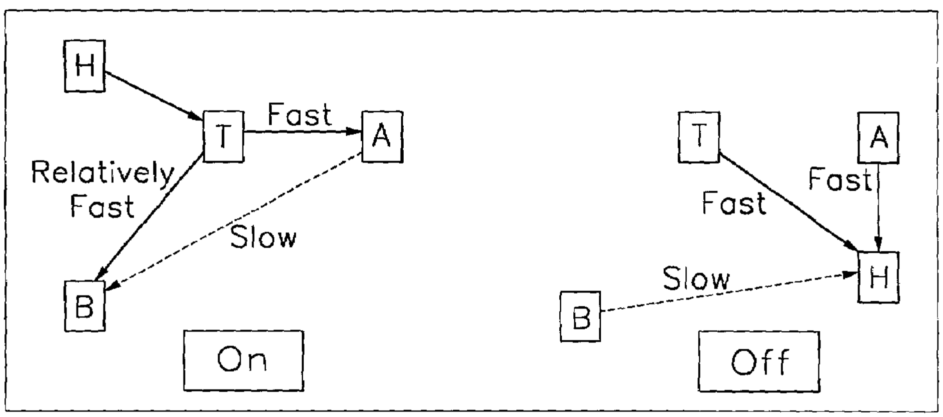
FIG. 2 shows a view for illustrating ON/OFF cycle of the typical OCB mode.
Figure 3:
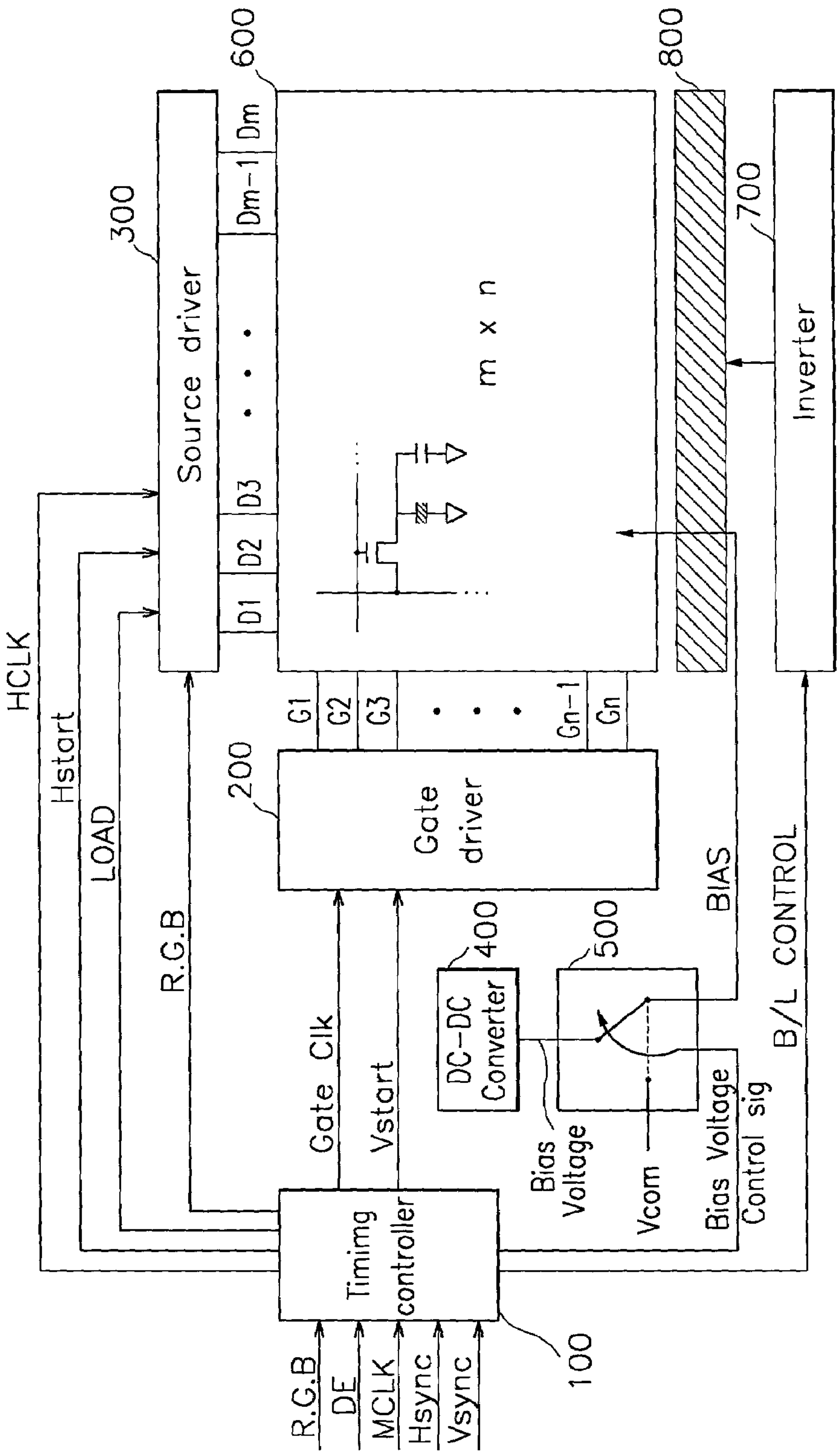
FIG. 3 shows a view for illustrating a liquid crystal display device for fast transition into bend state according to an embodiment of the present invention.

FIG. 3 shows a view for illustrating a liquid crystal display device for fast transition into bend state according to an embodiment of the present invention.

Referring to FIG. 3, a liquid crystal display device for fast transition into bend state according to an embodiment of the present invention includes a timing controller 100, a gate driver 200, a data driver 300, a direct current power conversion unit, e.g., a DC—DC converter 400, a switching unit 500, an LCD panel 600, another direct current power conversion unit, e.g., an inverter 700, and a backlight.

In general, powers required for each circuit block within an LCD module are produced by increasing or decreasing a voltage from a single power supply irrespective of a kind of display device, and a kind of power supply for each circuit block within the LCD module includes the DC—DC converter 400 and the inverter 700 for driving the backlight.

In the embodiment of the present invention, the DC—DC converter 400 outputs a predetermined bias voltage, which level may be less or more level than that of a common electrode voltage (typically 5 V) applied to the LCD panel 600, to the switching unit 500. In other words, a difference between the bias voltage and a data voltage larger than a difference between the common electrode voltage and the data voltage can accomplish fast transition into bend state at initial operation. As a high voltage of 27 volt outputted from the gate can be substantially used, it is preferable to use a high level of voltage rather than a low level of voltage.

The switching unit 500 selects one of a common electrode voltage Vcom applied to the LCD panel 600 and a bias voltage outputted from the DC—DC converter 400, based on a bias voltage control signal provided by the timing controller 100, to output a selected one to the LCD panel 600.

The LCD panel 600 consists of a plurality of pixel electrode formed in an m×n matrix type. When gate voltages G1, G2, . . . , Gn provided by the gate driver 200 are applied to relevant pixels, the relevant pixels are driven responsive to data voltages D1, D2, . . . , Dm provided by the data driver 300. At that point, as a high voltage is applied initially to liquid crystal molecules of OCB mode inside the LCD panel 600, tilt angle of liquid crystal molecules in the middle of liquid crystal layer becomes 90° rapidly.

The inverter 700 applies a predetermined voltage for driving the backlight 800 positioned at the back side of the LCD panel 600 based on a backlight control signal applied by the timing controller 700. Typically, the inverter 700 for driving the backlight is a separate module mounted with components such as chopper and transformer and coupled to the LCD module in the entire system.

The timing controller 100 outputs data voltage and gate voltage not selected to the data driver 300 and the gate driver 200, respectively, and controls the switching unit 500 to provide the bias voltage provided by the DC—DC converter 400 to the LCD panel 600. At that point, the external bias voltage selected by the switching unit 500 is applied to the LCD panel to increase the speed of transition into bend state.

In addition, the timing controller 100 provides the backlight control signal B/L CONTROL for driving the backlight 800 for the inverter 700 when a predetermined time being an estimated time required for transition into bend state elapses and controls the switching unit 500 to provide the common electrode voltage Vcom to the LCD panel 600.

At that time, instead of measurement of the predetermined time, a switching timing may be determined by measuring transition into bend state by use of optical sensors (e.g., a light emitting device, a light receiving device, and an actinometer). Besides, a change of capacitance may be checked by use of electrostatic sensor.

As described above, time for transition into bend state can be shortened by turning ON/OFF several times the common electrode voltage applied to the LCD panel at initial operation of the liquid crystal display device with OCB mode, and particularly can be more shortened by applying the external bias voltage of less level than the common electrode voltage.

Now, operation for driving a liquid crystal display device for fast transition into bend state according to an embodiment of the present invention will be hereinafter described in detail.

Figure 4:
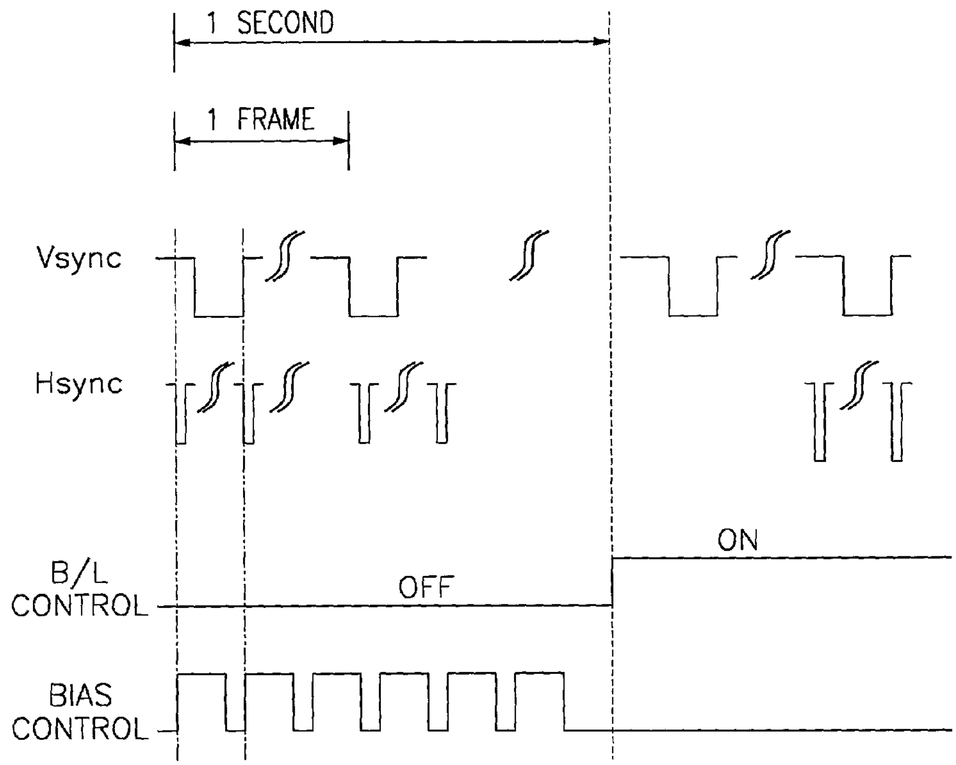
FIG. 4 shows a waveform for illustrating signals shown in FIG. 3.

FIG. 4 shows a waveform for illustrating signals shown in FIG. 3.

Referring to FIGS. 3 and 4, when a vertical synchronization signal Vsync and a horizontal synchronization signal Hsync are applied to the timing controller 100 so that the liquid crystal display device starts up, the timing controller 100 applies the backlight control signal B/L CONTROL of OFF level to the inverter 700 for driving the backlight 800 during a predetermined time (1 second in the embodiment of the present invention) such that the backlight is not driven and, when the predetermined time elapses, applies the backlight control signal B/L CONTROL of ON level to the inverter 700 such that the backlight is driven.

In addition, the timing controller 100 applies a bias control signal BIAS CONTROL for controlling switching operation of the switching unit 500. During the predetermined time (1 second in the embodiment of the present invention), a pulse voltage, i.e., bias control signal BIAS CONTROL of ON level for selecting periodically the external bias voltage and the common electrode voltage Vcom is applied to the switching unit 500 and, when the predetermined time elapses, the bias control signal of OFF level is applied to the switching unit 500.

In other words, in the state that transition into bend state is not completed, the backlight control signal of OFF level is applied to the inverter 700 such that the operation of backlight is interrupted and simultaneously a low level of common electrode voltage and a high level of external bias voltage are applied to the LCD panel 600 in a switching manner for increasing speed of transition into bend state and, in the state that transition into bend state has completed, the backlight control signal is applied to the inverter for controlling driving of the backlight positioned at the back side of the LCD panel.

Figure 5:
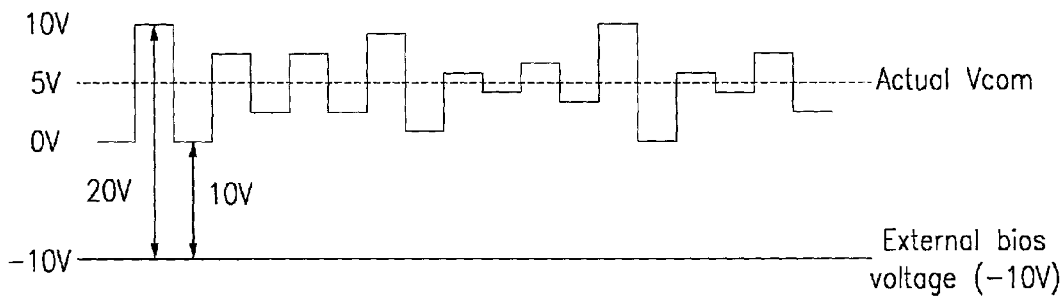
FIG. 5 shows a view for illustrating an example of an external bias voltage according to the present invention.

FIG. 5 shows a view for illustrating an example of an external bias voltage according to the present invention.

As shown in FIG. 5, the external bias voltage is a voltage of less level than that of the typical common electrode voltage Vcom applied to the LCD panel, as illustrated with one example in FIG. 5.

In this manner, by applying the common electrode voltage with a level lower than a typical level to the common electrode in order to accomplish fast transition into bend state at initial operation of the liquid crystal display device using the LCD panel with the OCB mode, as DC voltage of at least 10 volt to 20 volt is applicable between the common electrode and pixel electrodes, time for transition into bend state can be reduced at initial operation of the liquid crystal display device using the LCD panel with OCB mode.

In the embodiment of the present invention described above, as the magnitude of voltage applied to pixels is proportional to the speed of transition into bend state, though a level of voltage applied to the LCD panel is exemplified by −10 volt and −20 volt, it is not intended to be limited to that.

Figure 6:
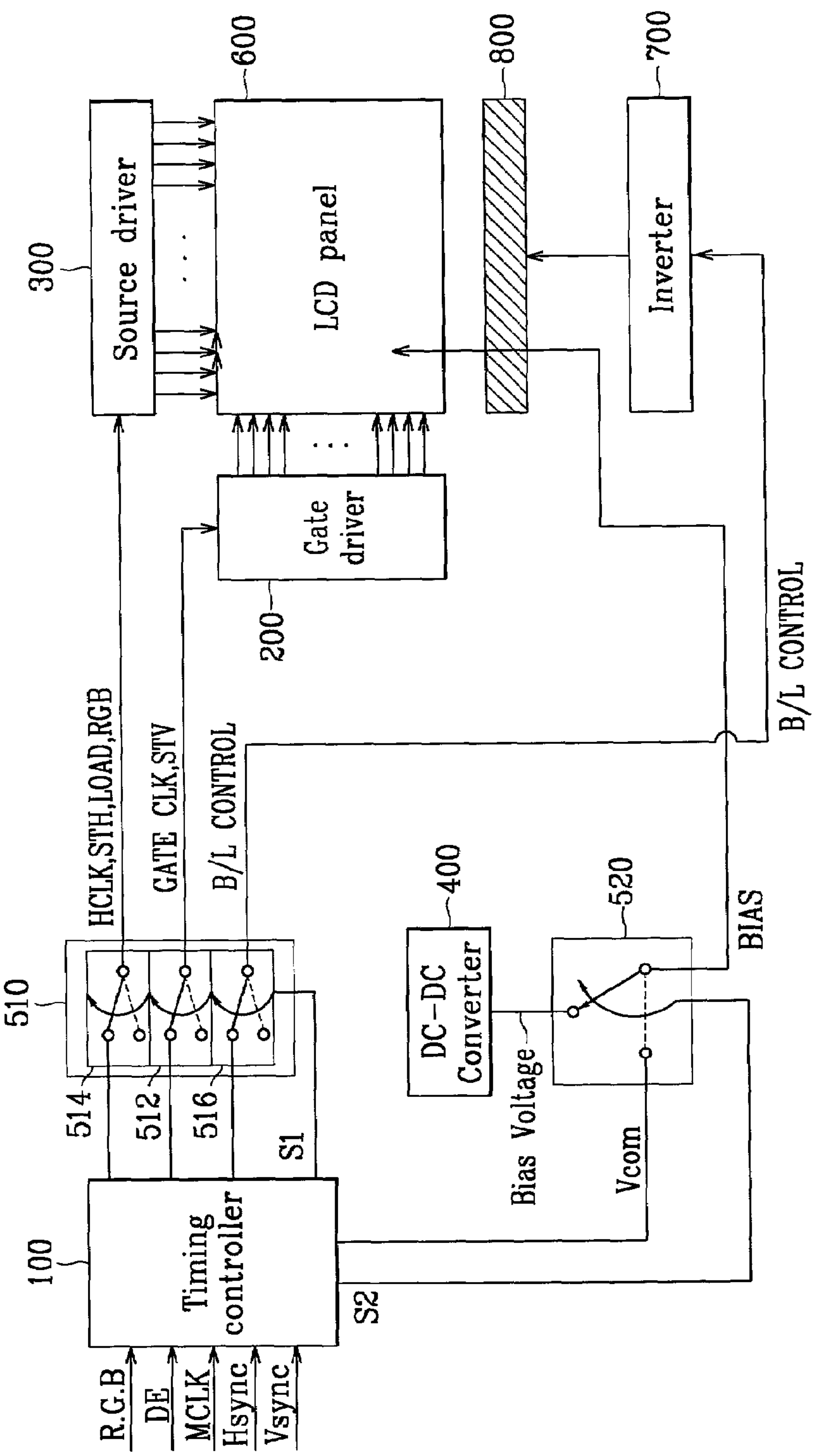
FIG. 6 shows a view for illustrating a liquid crystal display device for fast transition into bend state according to another embodiment of the present invention.

FIG. 6 is a view for illustrating a liquid crystal display device for fast transition into bend state according to another embodiment of the present invention.

Referring to FIG. 6, a liquid crystal display device for fast transition into bend state according to another embodiment of the present invention includes a timing controller 100, a gate driver 200, a data driver 300, a DC—DC converter 400, a first switching unit 510, a second switching unit 520, an LCD panel 600, an inverter 700, and a backlight 800. Compared to FIG. 3, like elements are designated by like reference numerals and the descriptions thereof shall be omitted here.

The timing controller 100 provides the first switching unit 510 with a first switching signal S1 and the second switching unit 520 with a second switching signal S2.

The first switching unit 510 includes a first switch 512, a second switch 514, and a third switch 516, and on/off switches a gate voltage, a data voltage, and a backlight voltage to be outputted, according to the first switching signal S1.

More specifically, the first switch 512 controls an output of a signal for driving the gate driver provided by the timing controller 100 based on the first switching signal S1.

The second switch 514 controls an output of a signal for driving the source driver provided by the timing controller 100 based on the first switching signal S1.

The third switch 516 controls an output of a signal for driving the backlight provided by the timing controller 100 based on the first switching signal S1.

The second switching unit 520 switches a common electrode voltage Vcom provided by the timing controller 100 and an external bias voltage provided by the DC—DC converter 400, based on the second switching signal S2, to apply one of the common electrode voltage and the external bias voltage to a common electrode line of the LCD panel. For example, though one of the common electrode voltage and the external bias voltage may be selected to be outputted or both may be outputted at initial operation, it is preferable to select and output one of the common electrode voltage and the external bias voltage after initial operation.

Now, operation of the liquid crystal display device according to the above embodiment of the present invention will be in detail described.

Initially, as the liquid crystal display device starts up when a vertical synchronization signal Vsync and a horizontal synchronization signal Hsync are applied to the timing controller 100 by an application of power, each of a driving voltage for the gate driver and a driving voltage for the data driver not selected is applied to the gate driver 200 and the source driver 300, respectively, while the timing controller 100 is driven. Here, the driving voltage for the gate driver is a gate clock signal GATE CLK and a vertical synchronization start signal STV, and the driving voltage for the data driver is a horizontal clock signal HCLK, a horizontal synchronization start signal STH, a load signal LOAD, and a picture signal RGB.

At that time, the common electrode voltage Vcom outputted from the timing controller 100 to be used actually in the LCD panel 600 and the external bias voltage applied separately by the DC—DC converter 400 are alternatively selected by the second switching unit 520 to be applied as a bias voltage BIAS to the common electrode line (not shown) of the LCD panel 600.

On the other hand, as transition into bend state does not yet make in the LCD panel 600, the backlight 800 keeps OFF state.

When a first period elapses, a gate voltage and a data voltage applied to the gate driver 200 and the source driver 300, respectively, switch off by control of the first switch 510, and an external voltage is selected by control of the second switch 520 to be used as the bias voltage BIAS applied to the common electrode line (not shown) of the LCD panel 600.

At that time, while pixel electrodes toward switching elements TFT of the LCD panel keeps floating state, as a potential higher than a ground potential is applied to a upper common electrode, a high potential difference is instantaneously generated in pixels, resulting in transition into bend state. For the purpose of inducing a more effective bend state, it is preferable to apply alternatively 15 volt and 0 volt by the second switch 520.

When a second period elapses, the second switch 520 continue to select the common electrode voltage Vcom by control of the timing controller 100 after a predetermined period to complete transition into bend state of the LCD panel 600. At that time, the backlight 800 should be turned off until all transition into bend state is completed.

When a third period elapses, after completion of transition into bend state, the first switch 510 controlled by the timing controller 100 switches on so that the gate voltage, the data voltage, and power for the backlight are provided to the gate driver 200, the source driver 300, and the inverter 700, respectively.

Figure 7:
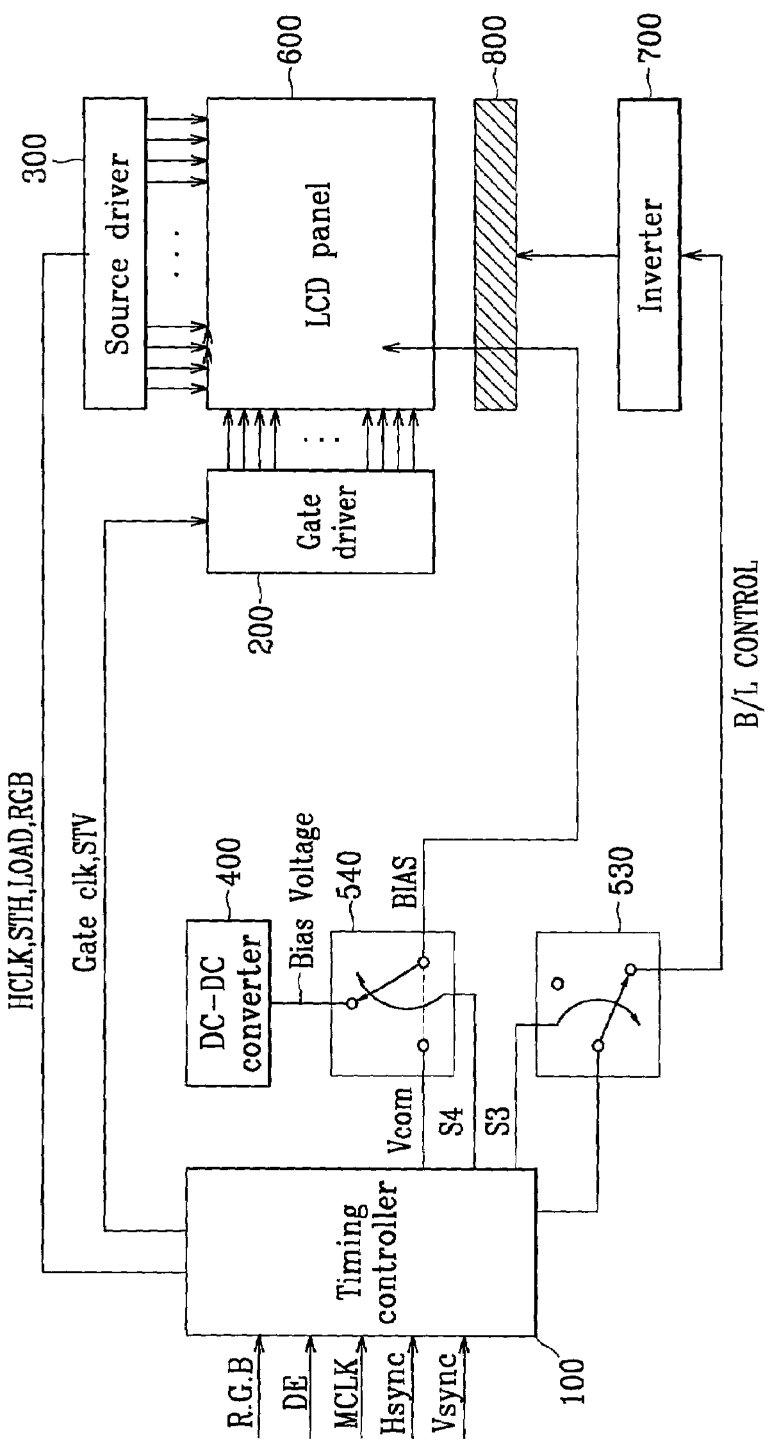
FIG. 7 shows a view for illustrating a liquid crystal display device for fast transition into bend state according to still another embodiment of the present invention.

FIG. 7 shows a view for illustrating a liquid crystal display device for fast transition into bend state according to still another embodiment of the present invention.

Referring to FIG. 7, a liquid crystal display device for fast transition into bend state according to still another embodiment of the present invention includes a timing controller 100, a gate driver 200, a data driver 300, a DC—DC converter 400, a first switching unit 530, a second switching unit 540, an LCD panel 600, an inverter 700, and a backlight 800. Compared to FIGS. 3 and 6, like elements are designated by like reference numerals and the descriptions thereof shall be omitted here.

The timing controller 100 provides the first switching unit 530 with a first switching signal S3 and the second switching unit 540 with a second switching signal S4.

The first switching unit 530 controls ON/OFF output of a backlight voltage according to the first switching signal S3.

The second switching unit 540 switches a common electrode voltage Vcom provided by the timing controller 100 and an external bias voltage provided by the DC—DC converter 400, based on the second switching signal S4, to apply one of the common electrode voltage and the external bias voltage to a common electrode line of the LCD panel 600. For example, though one of the common electrode voltage and the external bias voltage may be selected to be outputted or both may be outputted at initial operation, it is preferable to select and output one of the common electrode voltage and the external bias voltage after initial operation.

Now, operation of the liquid crystal display device according to the above embodiment of the present invention will be in detail described.

Initially, as the liquid crystal display device starts up when a vertical synchronization signal Vsync and a horizontal synchronization signal Hsync are applied to the timing controller 100 by an application of power, each of a driving voltage for the gate driver and a driving voltage for the data driver not selected is applied to the gate driver 200 and the source driver 300, respectively, while the timing controller 100 is driven. At that time, a bias voltage BIAS applied to a common electrode line (not shown) of the LCD panel 600 is an external bias voltage selected by the first switching unit.

When a first period elapses, for a bias voltage BIAS to be applied to a common electrode line (not shown) of the LCD panel 600, the external bias voltage is selected initially by the second switching unit 540 and subsequently the external bias voltage and the common electrode voltage Vcom outputted from the timing controller 100 to be used actually in the LCD panel are alternatively selected. Here, as transition into bend state does not yet make in the LCD panel 600, the backlight 800 keeps OFF state.

When a second period elapses, only the external bias voltage is selected by the second switching unit 540 to be used as the bias voltage BIAS applied to the common electrode line (not shown) of the LCD panel 600. At that time, an alternate voltage of a level approximately equivalent to a level of common electrode line Vcom is applied as the data voltage. For example, a potential difference of about 15 volt is uniformly applied to all pixels, which induces fast transition into bend state. For the purpose of inducing a more effective bend state, it is preferable to repeat several times the switching between the external bias voltage and the common electrode voltage.

When a third period elapses, the second switching unit 540 continue to select the common electrode voltage Vcom by control of the timing controller 100 to complete transition into bend state of the LCD panel 600. At that time, the backlight 800 should be turned off until all transition into bend state is completed.

When a fourth period elapses, after completion of transition into bend state, the first switching unit 530 controlled by the timing controller 100 switches on so that power for the backlight are provided to the LCD panel 600 via the inverter 700. At that time, it is to be understood that the liquid crystal display device will normally operate since transition into bend state has been made in the LCD panel.

In the above embodiments of the present invention, time of transition into bend state can be referred to time of initial operation of the liquid crystal display device within, preferably, 1 second.

In addition, for each of the above embodiments of the present invention, it was described to accomplish fast transition into bend state by configuring to level up or down the common electrode voltage in the timing controller so that the difference between the external bias voltage and the common electrode voltage is increased.

As is apparent from the above description, according to present invention, as fast transition into bend state can be achieved at initial operation of the liquid crystal display device using the LCD panel with OCB mode, time by which a user stands until a normal screen is presented in a monitor or TV using a liquid crystal display device as a display device can be reduced.

In addition, as an external bias voltage of less level than a typical common electrode voltage is simply used as a common electrode voltage at initial operation of LCD panel with OCB mode, a high voltage driver IC does not need to be adapted for applying data voltage of higher level than a fixed common electrode voltage in order to obtain fast transition into bend state and, accordingly, a liquid crystal display device can be driven at a low expense.

Although preferred embodiment of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display (LCD) device, comprising:

a control unit receiving an RGB picture signal and a first timing signal from the external and outputting the RGB picture signal, a second timing signal for displaying the RGB picture signal on a screen, a backlight control signal and a bias voltage;

a first direct current power conversion unit responsive to an ON state of the backlight control signal for applying a backlight driving voltage;

a backlight unit outputting light according to the application of the backlight driving voltage;

a gate driver outputting a scan signal;

a source driver outputting a picture signal; and an LCD panel including:

a plurality of gate lines transmitting the scan signal;

a plurality of source lines intersecting the plurality of gate lines and transmitting the image signal;

a plurality of switching elements connected to the gate lines and the source lines, respectively;

a plurality of picture electrodes connected to the switching elements and arranged in a matrix type; and a common electrode line receiving the bias voltage at an initial operation of the LCD, wherein the control unit comprises:

a timing controller outputting a first switching signal and the backlight control signal of OFF state at the initial operation and outputting a second switching signal and the backlight control signal of ON state after a predetermined period elapses;

a second direct current power conversion unit outputting the bias voltage; and a switching unit outputting the bias voltage to the common electrode line when the first switching signal is applied by the timing controller and the common electrode voltage to the common electrode line when the second switching signal is applied by the timing controller.

2. The LCD device of claim 1, wherein the timing controller applies the backlight control signal of OFF state to the second direct current power conversion unit at the initial operation, and applies backlight control signal of ON state to the first direct current power conversion unit at the point that transition into bend state of liquid crystal arranged in the LCD panel is completed when a predetermined period elapses.

3. The LCD device of claim 1, wherein the bias voltage is less than the common electrode voltage.

4. The LCD device of claim 3, wherein the bias voltage is one of −10 volt and −20 volt.

5. The LCD device of claim 1, wherein the timing controller outputs an alternatively selected one of the first switching signal and the second switching signal when the backlight control signal of OFF state is applied.

6. A driving apparatus of a liquid crystal display device including a gate driver outputting scan signals sequentially; a source driver outputting picture signals; a liquid crystal display (LCD) panel including a plurality of gate line transmitting the scan signals, a plurality of data lines intersecting the plurality of gate lines transmitting the picture signals, a plurality of switching elements formed in regions surrounded by the plurality of gate lines and data lines and connected to the plurality of gate lines and data lines, respectively, and a plurality of picture electrodes connected to the plurality of switching elements for responding operation of the plurality of switching elements, arranged in a matrix type; a common electrode receiving a bias voltage at an initial operation of the LCD; and a backlight positioned at a back side of the LCD panel, comprising:

a control unit receiving a RGB picture signal and a first timing signal from an external device and outputting the RGB picture signal, a second timing signal for displaying the RGB picture signal on a screen, a backlight control signal and a the bias voltage; and a first direct current power conversion unit responsive to an ON state of the backlight control signal for applying a backlight driving voltage to the backlight, wherein the control unit comprises:

a timing controller outputting a first switching signal and the backlight control signal of OFF state at an initial operation and outputting a second switching signal and the backlight control signal of ON state after a predetermined period elapses;

a second direct current power conversion unit outputting the bias voltage; and a switching unit outputting the bias voltage to the common electrode when the first switching signal is applied by the timing controller and the common electrode voltage to the common electrode when the second switching signal is applied by the timing controller.

7. The driving apparatus of claim 6, wherein the timing controller applies the backlight control signal of OFF state to the second direct current power conversion unit at initial operation, and applies the backlight control signal of ON state to the first direct current power conversion unit at the point that transition into bend state of liquid crystal arranged in the LCD panel is completed when a predetermined period elapses.

8. The driving apparatus of claim 7, wherein the bias voltage is one of −10 volt and −20 volt.

9. The driving apparatus of claim 6, wherein the bias voltage is less than the common electrode voltage.

10. The driving apparatus of claim 6, wherein the timing controller outputs an alternatively selected one of the first switching signal and the second switching signal when the backlight control signal of OFF state is applied.

11. A driving method of a liquid crystal display (LCD) device including a LCD module including a LCD panel, a gate driver, and a data driver; and a backlight positioned at a back side of the LCD panel, comprising steps of:

(a) inducing transition into bend state by a high voltage by applying a data voltage and a gate voltage not selected at initial operation of the liquid crystal display device to the LCD panel and applying an external bias voltage separately to a common electrode of the LCD panel;

(b) interrupting the external bias voltage when a predetermined time elapses and applying a common electrode voltage to the common electrode; and (c) applying a predetermined backlight driving voltage to the backlight at the same time of applying the common electrode voltage to the common electrode.

12. The driving method of claim 11, wherein the step (a) further comprises a step of selecting alternatively the external bias voltage and the common electrode voltage several times and applying a selected one of the external bias voltage and the common electrode voltage to the common electrode.

13. The driving method of claim 12, wherein the step (a) includes applying the backlight driving voltage of OFF state to the backlight.

14. The driving method of claim 11, wherein the predetermined time elapses when transition into a bend state is completed.

15. The driving method of claim 11, wherein the step (a) includes applying the backlight driving voltage of OFF state to the backlight upon applying the external bias voltage separately to the common electrode.

16. A driving method of a liquid crystal display (LCD) device including an LCD module including an LCD panel, a gate driver and a data driver and a backlight positioned at a back side of the LCD panel, comprising steps of:

(a) controlling a gate voltage and a data voltage to be applied to the LCD panel at an initial operation of the liquid crystal display device and controlling output of an external bias voltage and a common electrode voltage;

(b) preventing the gate voltage, the data voltage, and the common electrode voltage from being applied to the LCD panel, and selecting the external bias voltage to be applied to a common electrode line of the LCD panel;

(c) applying the common electrode voltage replacing the external bias voltage to the common electrode;

(d) when a predetermined period elapses, interrupting the application of the external bias voltage, applying the gate voltage and the data voltage to the LCD panel, and applying the common electrode voltage to the common electrode line; and (e) applying a predetermined backlight driving voltage to the backlight at the same time of applying the common electrode voltage to the common electrode line.

17. The driving method of claim 16, wherein the step (b) includes applying alternatively a high voltage and a low voltage when the external bias voltage is applied.

18. A driving method of a liquid crystal display (LCD) device including an LCD module including an LCD panel, a gate driver and a data driver; and a backlight positioned at a back side of the LCD panel, comprising steps of:

(a) controlling a gate voltage and a data voltage to be applied to the LCD panel at an initial operation of the LCD device and controlling output of an external bias voltage and a common electrode voltage;

(b) controlling the external bias voltage and the common electrode voltage to be alternatively applied to a common electrode line the LCD panel several times;

(c) applying the common electrode voltage replacing the external bias voltage to the common electrode line;

(d) maintaining output of the common electrode voltage and controlling output of the backlight driving voltage;

(e) when a predetermined period elapses, interrupting the application of the external bias voltage, applying the gate voltage and the data voltage to the LCD panel, and applying the common electrode voltage to the common electrode line of the LCD panel; and (f) applying a predetermined backlight driving voltage to the backlight at the same time of applying the common electrode voltage to the common electrode line.

19. The driving method of claim 18, wherein the step (b) includes controlling the data voltage to be applied with a level equivalent to the level of the common electrode voltage.

20. The driving method of claim 18, wherein the data voltage is an alternate voltage.

* * * * *